SEMICONDUCTOR STRUCTURE WITH FUSIBLE LINK AND METHOD

Filed Dec. 11, 1968

3 Sheets-Sheet 1

INVENTORS
Edward M. Aoki
BY David R. Peterson
Flehr, Hohbach, Test, Albritton & Herbert
Attorneys

SEMICONDUCTOR STRUCTURE WITH FUSIBLE LINK AND METHOD

Filed Dec. 11, 1968 3 Sheets-Sheet 2

INVENTORS
Edward M. Aoki
BY David R. Peterson
Flehr, Hohbach, Test,
Albritton & Herbert
Attorneys Feb. 16, 1971 E. M. AOKI ET AL 3,564,354

SEMICONDUCTOR STRUCTURE WITH FUSIBLE LINK AND METHOD

Filed Dec. 11, 1968

3 Sheets-Sheet 3

INVENTORS
Edward M. Aoki
David R. Peterson
BY Flehr, Hohbach, Test, Albritton & Herbert
Attorneys United States Patent Office 3,564,354

Patented Feb. 16, 1971

3,564,354

SEMICONDUCTOR STRUCTURE WITH FUSIBLE LINK AND METHOD

Edward Masami Aoki, Cupertino, and David R. Peterson, Palo Alto, Calif., assignors to Signetics Corporation, Sunnyvale, Calif., a corporation of California Filed Dec. 11, 1968, Ser. No. 783,093

Int. Cl. H01l 1/14, 5/02, 19/00

U.S. Cl. 317—235 13 Claims

ABSTRACT OF THE DISCLOSURE

Semiconductor structure having a fusible link formed by a portion in a lead structure carried by a semiconductor body in which the portion is characterized in that it can be fused with a relatively precise current level, and a method for forming the semiconductor structure with such a fusible link.

BACKGROUND OF THE INVENTION

Fusible links have heretofore been provided in certain semiconductor structures as, for example, diode matrices. However, in such semiconductor structures, the fusible links have not been very precise with respect to the amount of current which is required to fuse them. In addition, the current required has been unduly large. There is, therefore, a need for a new and improved semiconductor structure having fusible links and a method for making the same.

SUMMARY OF THE INVENTION AND OBJECTS

The semiconductor structure consists of a semiconductor body with semiconductor devices formed in the body. A lead structure is formed on the body and makes contact with the devices formed in the body. The lead structure includes at least one portion which forms the fusible link. The fusible link has relatively precise dimensions so that it can be fused with a relatively precise current level flowing through the same. In one embodiment of the semiconductor structure, the fusible link is formed by taking advantage of the thinner portion of a fusible link which is formed by evaporation of the lead structure over a raised element carried by the semiconductor body. In another embodiment, the fusible link is formed over a material carried by the semiconductor body which is subsequently etched out from under the fusible link so that the underside of the fusible link is exposed to the atmosphere. In both the embodiments, the fusible link can be covered with a layer of insulating material to prevent metal from the fusion of the fusible link from short circuiting the circuitry carried by the semiconductor body. The method consists of the steps for making the semiconductor structures with the two types of fusible links.

In general, it is an object of the present invention to provide a semiconductor structure having a fusible link which can be fused at a relatively precise current level.

Another object of the invention is to provide a semiconductor structure having a fusible link which can be readily fused without endangering the circuitry to which it is connected.

Another object of the invention is to provide a semiconductor structure of the above character in which the particles of diffusion are retained to prevent short circuits and the like.

Another object of the invention is to provide a method for forming a semiconductor structure of the above character which is relatively simple and economical.

Additional objects and features of the invention will appear from the following description in which the preferred embodiments are set forth in detail in conjunction with the accompanying drawing.

DESCRIPTION OF THE PREFERRED EMBODIMENTS

Figure 1:
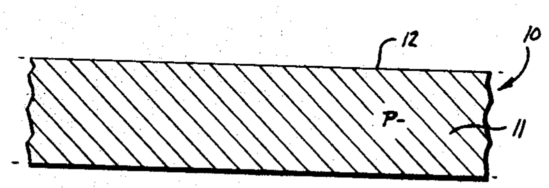
FIGS. 1–5 are cross-sectional views showing certain of the processing steps for making a semiconductor structure incorporating the present invention.

In fabricating the semiconductor structure having fusible links as shown in FIGS. 1–13, a semiconductor body 10 is provided which can be formed of a layer 11 of monocrystalline silicon and can be either undoped or doped with an impurity. If it is undoped, then at least a portion of the layer 11 is doped with the desired impurity. Let it be assumed that the layer 11 has been doped in its entirety with a P-type impurity as shown in FIG. 1. The layer 11 is provided with at least one relatively planar surface 12 through which the diffusion operations are carried out as hereinafter described. Certain types of devices require or benefit from the use of an epitaxial layer in which the semiconductor body 10 includes an additional layer 13 in a manner well known to those skilled in the art on the surface 12 and is provided with a surface 14 which is parallel to the surface 12. When an epitaxial layer is utilized as shown in FIG. 2, the semiconductor body 10 is formed of two layers 11 and 13 which have the exposed planar surface 14.

Figure 2:
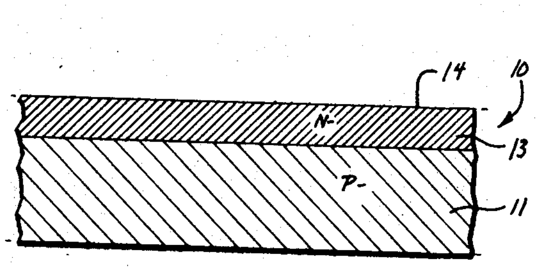
Figure 3:
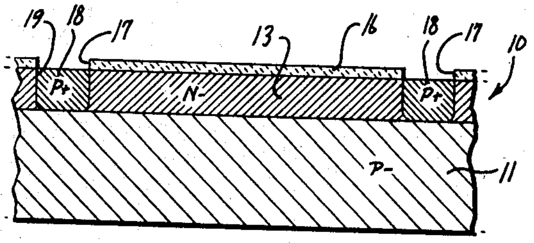
Figure 4:
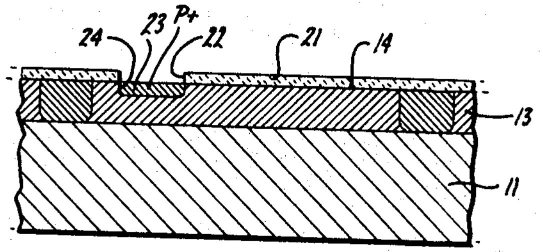
Figure 5:
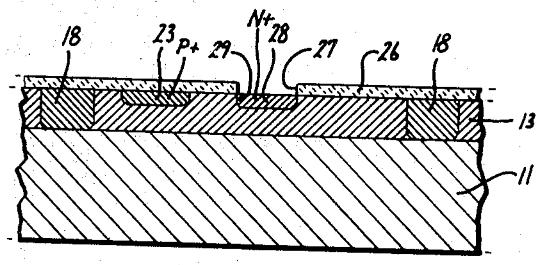
Figure 7:
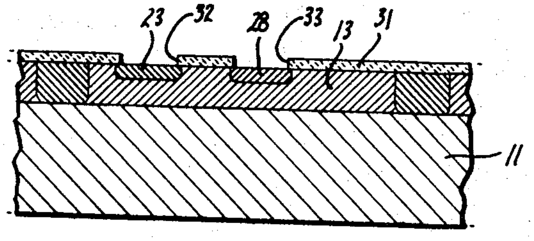
FIG. 7 is a partial cross-sectional view taken along the line 7—7 of FIG. 6.
Figure 9:
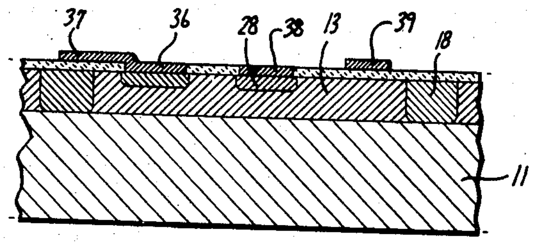
FIG. 9 is a cross-sectional view taken along the line 9—9 of FIG. 8.
Figure 11:
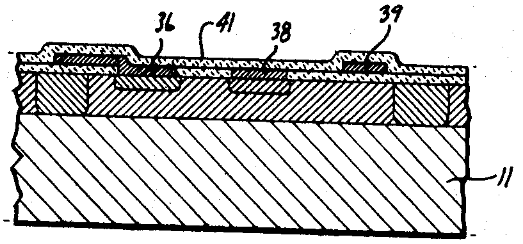
FIG. 11 is a cross-sectional view taken along the line 11—11 of FIG. 10.

After the epitaxial layer 13 has been formed, the entire structure which is shown in FIG. 2 is placed in an oxidizing atmosphere to form a silicon dioxide layer 16 at least on the surface 14. Thereafter, holes 17 are etched into the silicon dioxide layer 16 by conventional photolithographic techniques. A P+ impurity is diffused through the openings 17 to form P+ regions 18 which extend down through the epitaxial layer 13 to form a junction which extends from the P— layer 11 up to the surface 14 of the epitaxial layer 13. These P+ regions 18 serve as isolation walls as hereinafter described.

The silicon dioxide layer 16 is then stripped and a new oxide layer 21 is grown thereon and openings 22 are formed therein by photolithographic techniques and a P+ impurity is diffused therethrough to provide P+ regions 23 which are defined by dish-shaped junctions 24 which do not extend to the P— region but which extend to the surface 14. The P+ regions 23 serve as one of the regions for the semiconductor devices which are to be formed in the semiconductor body. When diodes are being formed in the semiconductor body, the P+ regions 23 serve as the anodes of the diodes.

The cathodes of the diodes are formed in a similar manner. Thus, the oxide layer 21 is stripped and a new oxide layer is grown. Openings 27 are formed in the oxide layer 26 and an N+ impurity is diffused through the openings 27 to provide the N+ regions 28 which are defined by dish-shaped junctions 29 which extend to the same depth as junctions 24 to the surface.

Figure 6:
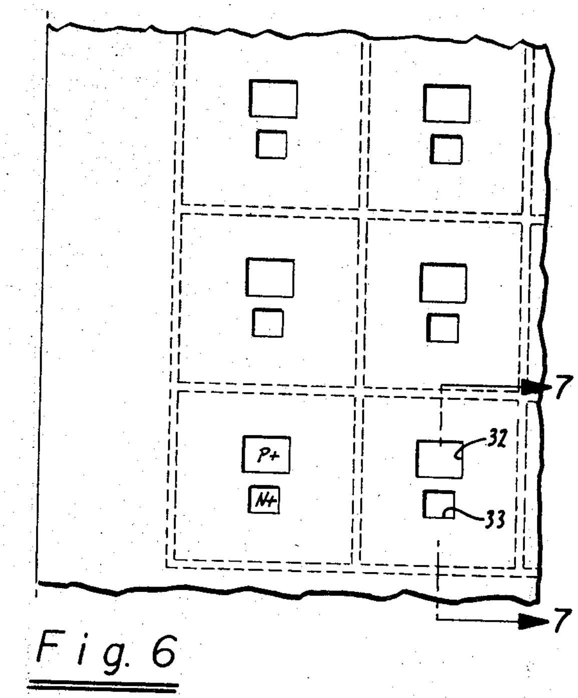
FIG. 6 is a plan view of a portion of the semiconductor structure showing the next processing step.
Figure 8:
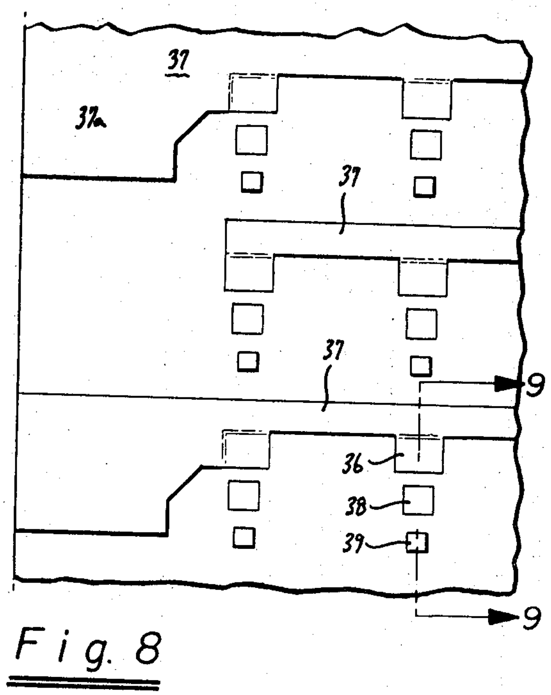
FIG. 8 is another plan view of the semiconductor structure showing the next processing step.

The oxide layer 26 can then be stripped and a new oxide layer 31 grown. Windows or openings 32 and 33 are then formed in the oxide layer 31 as shown in FIG. 6 which generally overlie the P+ regions 23 and the N+ regions 28. A lead structure 34 is formed by a layer of a suitable conducting metal such as aluminum which is deposited on the silicon dioxide layer 31 and into the openings 32 and 33. Thereafter, by suitable photolithographic techniques, the undesired portions of the metal are removed. There remain contact pads 36 in contact with the P+ regions 23. As shown, the contact pads 36 are interconnected by a bus bar 37 and, as can be seen from FIG. 8, alternate bus bars 37 run in opposite directions on the semiconductor body. As can be seen from FIG. 9, there also remain contact pads 38 for the N+ regions 28. At points adjacent to the regions 28, pads 39 of aluminum remain on the surface of the silicon dioxide layer 31 adjacent to the N+ regions 28.

Figure 10:
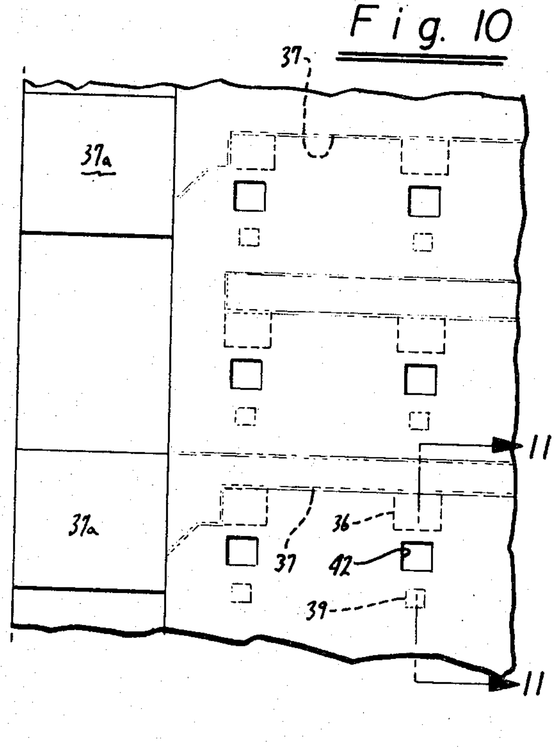
FIG. 10 is another plan view of the semiconductor structure showing the next processing step.
Figure 12:
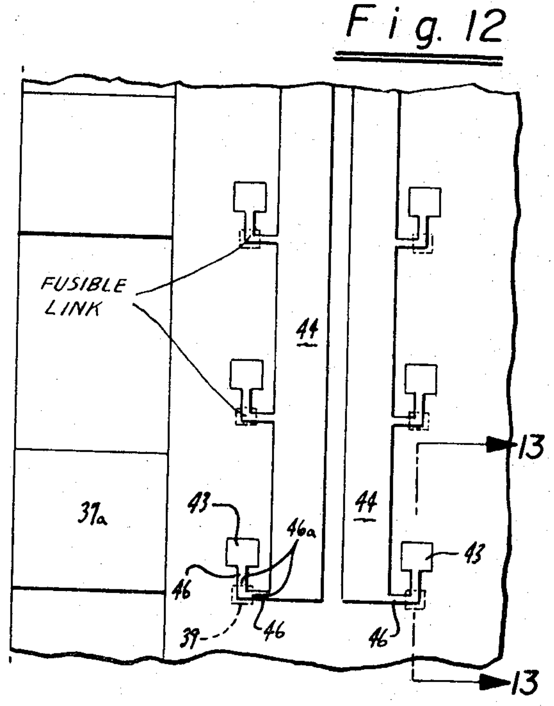
FIG. 12 is another plan view of the semiconductor structure showing the next processing step.
Figure 14:
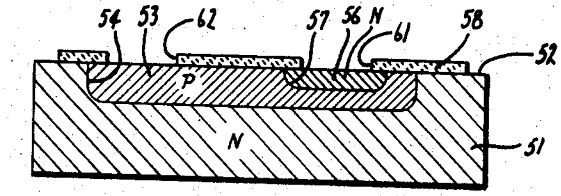
FIGS. 14–19 are cross-sectional views showing the processing steps for making another embodiment of the semiconductor structure incorporating the present invention.

Thereafter, as shown in FIG. 10, a layer 41 of an insulating material, such as glass formed by a silicon dioxide layer, is deposited over the entire surface of the semiconductor structure with the exception of the terminal portions 37*a* of the bus bars 37 as shown in FIG. 10. Openings 42 are then cut into the layer 41 by suitable photolithographic techniques. As can be seen from FIG. 10, the openings 42 overlie the contact pads 38. The lead structure 34 includes a second metal layer of suitable material, such as aluminum, which is deposited on the surface of the layer 41 and this layer is etched by suitable photolithographic techniques so that there remain contact pads 43 which are in contact with contact pads 38. Bus bars 44 interconnect contact pads 43. Contact pads 43 are connected to the bus bars 44 by relatively narrow interconnecting links 46. As can be seen particularly from FIG. 12, the interconnecting links 46 extend through a right angle and extend up over the raised portion or step-like portion of the insulating layer 41 which is raised because of the pad 39 provided therebelow. It has been found that when the metal is deposited for forming the interconnecting links 46, there is a thinning of the interconnecting link 46 at the point of the step in the insulating layer 41 as shown particularly in FIG. 13A so that there is provided a thinner portion 46*a* in the interconnecting link 46 which has a relatively precise cross-sectional area and which also has a relatively precise length, width and depth.

Figure 13:
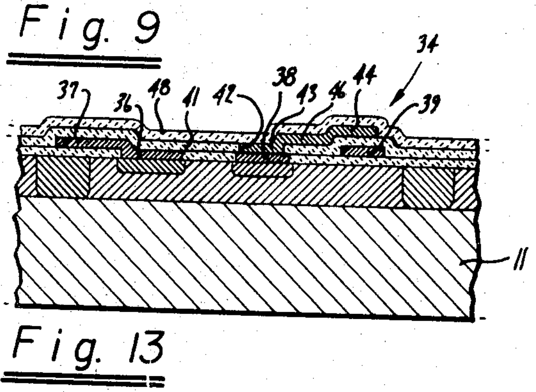
FIG. 13 is a cross-sectional view taken along the line 13—13 of FIG. 12.
Figure 13A:
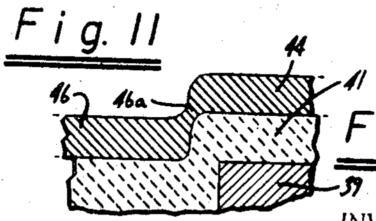
FIG. 13A is an enlarged portion of the section shown in FIG. 13 and shows the fusible link.

Next, a layer 48 of a suitable insulating material is deposited over the entire structure which is shown in FIG. 13 and which is to serve as a trap for fusion particles as hereinafter described. One material found to be satisfactory is a silicone varnish. Several applications of this silicone varnish can be applied if desired.

Operation of the semiconductor structure shown in FIGS. 1–13 may now be briefly described as follows. Let it be assumed that a plurality of diodes have been formed in the manner hereinbefore described and that it is desired to provide a particular diode array. It can be seen that the diodes are isolated by rows formed by the P+ regions 18 which extend through the layer 13. It also can be seen that all the diodes are formed in a common N− bed formed by the layer 13. By applying the appropriate potentials, the diodes are isolated by reversed bias junctions 19. The regions 23 which serve as the cathodes of the diodes are interconnected by the common bus bars 37. The anode regions 28 are interconnected by the narrowed-down or thinner interconnecting links 46. The interconnecting links 46 can have any desired dimensions; for example, they can have a width of 10 microns and a thickness of approximately 6000 angstroms.

Now let it be assumed that it is desired to disconnect certain diodes from the array. This can be accomplished by making contact with the contact pad 37*a* of the bus bar 37 with one terminal of a current supply and then connecting the other terminal of the current supply to the anode pad 43 and then passing sufficient power through the diode which is insufficient to harm the diode but which is sufficiently great to cause fusion of the portion 46*a*. Fusion will occur at a relatively precise current level passing through the portion 46*a* to cause a separation or discontinuity to occur in the interconnecting link 46 to thereby disconnect the diode involved from the bus bar 44. This same procedure can be utilized to remove other diodes from the array.

It has been found that this method for providing discontinuities or breaks in the interconnect links 46 is relaflexible enough to absorb the fusion particles without damaging the other semiconductor devices carried by the semiconductor body. The insulating layer 48 above the interconnect links 46 serves to entrap any molten metal produced during fusion and prevents particles of the molten metal from contaminating other parts of the circuit, and, therefore, prevents possible short circuits. The varnish which forms the layer 48 has been found to be flexible enough to absorb the fusion particles without stress.

The use of the second layer metallization for forming the interconnecting links 46 is desirable because this reduces the power dissipation because the resistance losses are reduced. The use of this type of interconnecting link is also desirable in that it is unnecessary to have high temperatures on the semiconductor body at the time of fusion.

Another method for making another embodiment of a semiconductor structure incorporating the present invention is shown in FIGS. 14–19. In forming such a semiconductor structure, a semiconductor body 51 is provided which, as described in conjunction with the previous embodiment, can be either doped or undoped. Let it be assumed that it has been doped with an N-type impurity as shown in the drawing. The semiconductor body 51 is provided with a planar upper surface 52. The semiconductor body 51 is then placed in an oxidizing atmosphere to grow a layer of insulating material such as silicon dioxide which can serve as a mask. As hereinbefore described, convenitional techniques are utilized to form a region 53. Typically, this region can be formed by cuttng a hole in the oxide and diffusing a P-type impurity into the semiconductor body 51 to provide the region 53 which is defined by a junction 54 which extends to the surface 52. The insulating layer or mask is then stripped and another layer of insulating material is grown over the same, and thereafter an opening is provided in the insulating layer and an N-type impurity is diffused therethrough into the semiconductor body 51 to provide the N-type region 56. The N-type region is defined by a junction 57 which extends to the surface. As can be seen, both the junctions 54 and 57 are dish-shaped with the junction 57 being disposed within the junction 54. The oxide is again stripped and thereafter an oxide layer 58 s regrown on the surface 52 and openings 61 and 62 are formed in the silicon dioxide layer 58 on the surface 52.

Figure 15:
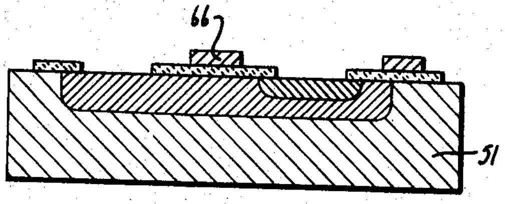

A layer of material which can be easily etched is placed upon the silicon dioxide layer 58 in a predetermined pattern. Thus, as shown in FIG. 15, there is provided a layer 66 which is formed on the silicon dioxide layer 58 in a predetermined pattern. One material found to be particularly suitable is a photoresist KTFR manufactured by Eastman Kodak. This material can either be deposited through a mask or preferably can be deposited over the entire surface and then exposed through a mask to provide the desired pattern and then removing the undesired portions by a suitable etch.

Figure 16:
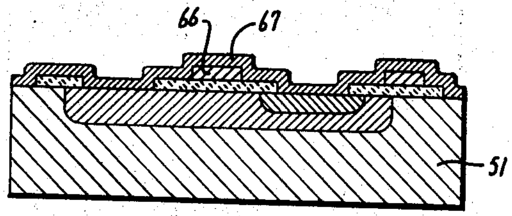
Figure 17:
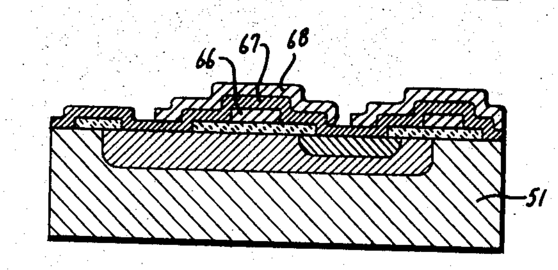
Figure 18:
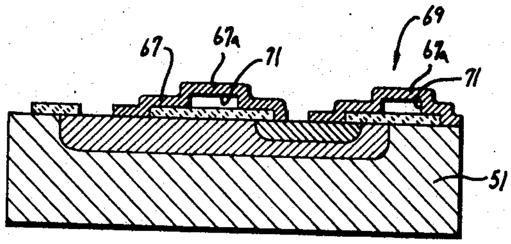

After the step shown in FIG. 15 has been completed, a layer 67 of metal is deposited over the entire top surface of the structure as shown in FIG. 16 with portions thereof entering the holes 61 and 62 provided in the silicon dioxide layer 58. The metal can be of any suitable material such as aluminum and can be deposited in any suitable manner such as by evaporation. A mask 68 of a suitable material such as KTFR is then placed over the aluminum layer 67 as shown in FIG. 17 in a predetermined pattern by conventional techniques. Thus, the KTFR layer 68 can be formed over the entire aluminum layer 67 and then exposed to a predetermined pattern and the undeveloped portions removed. The portions of the aluminum layer 67 which are exposed are then etched away by a suitable etch to provide a lead structure 69 as a part of the semiconductor structure which is shown in FIG. 18 with the exception that the KTFR would still be in place in the manner shown in FIG. 17.

Figure 19:
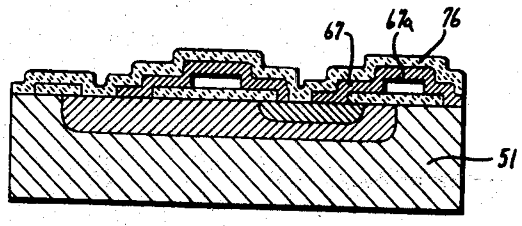

The KTFR photoresist is then removed. At the same time that the layer 68 is being removed, the KTFR elements 66 are also removed to provide air gaps or spaces 71 which underlie the aluminum lead structure 69. Thus, it can be seen that bridge portions **67*a* of aluminum are formed over the oxide layer 53. Thereafter, as shown in FIG. 19, a layer 76 of a suitable insulating material such as silicon dioxide is deposited over the lead structure 67 to provide passivation for the circuitry carried by the semiconductor body 51**.

Although aluminum has been described for making the layer 67, it is readily apparent that, if desired, other metals can be utilized for forming the layer 67 and the bridge portions **67*a*. The bridge portions 67*a* have predetermined cross-sectional dimensions and a precise length, width and depth because it is these bridge portions 67*a*** which serve as the fusible links.

The fusing current for the bridge portions **67*a* is determined by the ability to dissipate heat as current flows through the bridge portions and also is determined by the cross-sectional area and other dimensions of the bridge portions. By suspending the bridge portions in air in the manner hereinbefore described, the ability to dissipate heat is greatly reduced because air is a relatively good insulator. The layer 76** which is formed of an insulating material also prevents dissipation of heat. The current required to fuse one of the bridge portions which serves as a fusible link is then readily controlled by the thickness, width and length of the bridge portion. By way of example, with fusible links or bridge portions having a length of 15 microns, a width of 10 microns and a thickness of approximately 8000 angstroms, the average fusing current was approximately 600 milliamperes. With a fusible link of the same dimensions but 15 microns in length, the fusing current decreased to approximately 525 milliamperes. Wtih a length of 30 microns, the fusing current was reduced to approximately 350 to 375 milliamperes. When the width of the fusible link is reduced to 10 microns, and the fusible link has a length of 10 microns with a thickness of approximately 8000 angstroms, the fusing current is approximately 350 milliamperes. With a fusible link of 10 microns in width and 20 microns in length and the same thickness, the fusing current is approximately 200 milliamperes. Thus, it can be seen that the current level required to open or fuse a fusible link can be adjusted by either changing the width or the length of the fusible link.

To facilitate construction of the fusible links, it is desirable to hold the aluminum to a fairly constant thickness as, for example, a thickness of 1 micron. Even though the fusible link is relatively thin, it still has sufficient strength because the actual suspended weight is very small. By way of example, it ha been found that it is possible to provide fusible links with such a thickness having a length up to 120 microns.

In the making of fusible links which are suspended in air, other methods can be utilized other than the utilization of the photoresist. For example, a metal having an etch rate which is greater than that of the metal which is used for the fusible link could be utilized by first depositing it upon the insulating layer 58 and thereafter depositing the metal, such as aluminum, which is to be used for the fusible link upon the first metal which has been deposited. Thereafter, the underlying metal under the fusible link could be etched out by utilizing a selective etch. For example, nickel could be utilized in combination with aluminum and the nickel could be etched out by use of a concentrated nitric acid solution.

In practicing this process in making the fusible links, the material underneath the fusible link must be removable.

Let it be assumed that an array has been constructed of active and passive devices including transistors and diodes which are interconnected by fusible links made in accordance with the present invention. When it is desired to modify the array by eliminating certain of the elements from the array, the normal procedure is to fuse or break the fusible link by passing a current through the circuit branch which contains a fusible link using a constant current source such as a regulated D-C power supply. The flow of current is increased to a predetermined point to cause melting of the fusible link which should occur within a matter of seconds. In the conventional array, the array would have a plurality of X and Y input pads and the undesired elements could be removed by passing current through two of the inputs. In the embodiment shown in FIGS. 14–19, the layer of insulating material 17 is placed over the fusible links which prevents splattering of the fusible linke when it is fused. This serves to prevent the circuit from being short circuited by any of the metal particles which are evaporated during fusing of the fusible link.

If desired, the layer 76 of insulating material overlying the fusible links can be eliminated. It has been found that the use of such a layer slightly increases the fusing current which is required for fusing the fusible link.

It is apparent from the foregoing that there has been provided a semiconductor fusible link and method in which fusible links of a rather precise construction can be formed and which require the use of relatively uniform, precise current levels. The construction of the fusible links is such that fusion of links can take place without endangering the circuitry to which they are connected. In certain embodiments of the invention, the metal particles from the fusion of the fusible links are entrapped to prevent possible short circuits in the circuitry.

What is claimed is:

1. In a semiconductor structure, a semiconductor body, semiconductor devices formed in the semiconductor body, and a lead structure formed of thin metallic film carried by the body and making contact with the devices formed in the body to form an array, said lead structure including at least one fusible link means connected to one of said semiconductor devices, said fusible link means including first and second layers of conductive metal with one end of the first layer being adjacent one end of the second layer and spaced apart in a direction substantially at right angles to the longitudinal axes of the first and second layers and a portion joining said first and second layers, said portion having a cross-sectional area which is less than the cross-sectional areas of the first and second layers, said fusible link means having a dimension so that it can be fused with a relatively precise current level flowing through the same which is insufficient to harm said one of said semiconductor devices, said lead structure also including a contact element in electrical contact with said one semiconductor device, an additional contact element in electrical contact with said fusible link means whereby by use of said contact element and said additional contact element a current may be passed through said fusible link means and said one of said semiconductor devices to fuse said fusible link means to remove said one of said semiconductor devices from the array while leaving said one of said semiconductor devices unharmed.

2. A semiconductor structure as in claim 1 together with a layer of insulating material carried by the semiconductor body, said layer of insulating material carrying said first and second layers and said portions joining said first and second layers.

3. A semiconductor structure as in claim 1 wherein said semiconductor body has a planar surface and wherein at least certain of the devices are formed by diffused junctions extending to the surface together with a layer of insulating material carried by the semiconductor body and wherein said layer of insulating material has at least one portion thereof which is raised with respect to the other portions of the insulating material so that the layer of insulating material serves as a support for the first and second layers and the portion joining said fist and second layers of the fusible link.

4. A semiconductor structure as in claim 3 together with an additional layer of insulating material, said additional layer being disposed on said planar surface and underlying said first named layer of insulating material.

5. A semiconductor structure as in claim 4 wherein said lead structure includes one set of contact pads disposed on said additional layer of insulating material an an additional set of contact pads on said first named layer of insulating material.

6. A semiconductor struuture as in claim 3 wherein said insulating material is formed of silicon dioxide and wherein said fusible link is formed of aluminum.

7. In a semiconductor structure, a semiconductor body, semiconductor devices formed in the samiconductor body, and a lead structure formed of thin metallic film carried by the body and making contact with the devices formed in the body to form an array, said lead structure including at least one fusible link means connected to one of said semiconductor devices, said fusible link means being formed with a bridge portion which is spaced above the surface of the semiconductor body with a space formed between the bridge portion and the surface of the semiconductor body, said fusible link means having a dimension so that it can be fused with a relatively precise current level flowing through the same which is insufficient to harm said one of said semiconductor devices, said lead structure also including a contact element in electrical contact with said one semiconductor device and an additional contact element in electrical contact with said fusible link means whereby by use of said contact element and said additional contact element a current may be passed through said fusible link means and said one of said semiconductor devices to fuse said fusible link means to remove said one of said semiconductor devices from the array whil leaving said one of said semiconductor devices unharmed.

8. A semiconductor structure as in claim 7 together with a layer of insulating material overlying the fusible link means and serving to prevent dispersement of any metal particles during the fusion of the fusible link means.

9. A semiconductor structure as in claim 1 together with a layer of insulating material overlying the fusible link and serving to prevent dispersement of any metal particles during the fusion of the fusible link.

10. A semiconductor structure as in claim 9 wherein said layer of insulating material overlying said fusible link is in direct contact therewith.

11. In a method for forming a semiconductor structure, providing a semiconductor body having a plurality of semiconductor devices formed therein, providing a lead structure of thin metallic film on the semiconductor body connected to the devices of the semiconductor body to form an array, forming a step-like structure carried by the semiconductor body, forming in the lead structure at least one fusible link means connected to one of said semiconductor devices by forming the fusible link means so that at least one portion thereof is formed at the edge of the raised or step-like structure so that the portion has a reduced cross-sectional area which will be fused at a relatively precise current level that is insufficient to harm said one of said semiconductor devices and forming in the lead structure a contact element in contact with said one of said semiconductor devices and an additional contact element in electrical contact with the fusible link means whereby current may be passed through said fusible link means and said one of said semiconductor devices to fuse said fusible link means to remove said one of said semiconductor devices from the array while leaving said one of said semiconductor devices unharmed.

12. In a method for forming a semiconductor structure, providing a semiconductor body having a plurality of semiconductor devices formed therein, providing a lead structure of thin metallic film on the semiconductor body connected to the devices of the semiconductor body to form an array, forming in the lead structure at least one fusible link means connected to one of said semiconductor devices by forming the fusible link means over a step and then removing the step so that there is an air space provided below the fusible link means to inhibit the dissipation of heat into the semiconductor body so that the portion of the fusible link means overlying the air space will be fused at a relatively precise current level which is insufficient to harm said one of said semiconductor devices and forming in the lead structure a contact element in contact with said one of said semiconductor devices and an additional contact element in electrical contact with the fusible link means whereby a current may be passed through said fusible link means and said one of said semiconductor devices to fuse said fusible link means to remove said one of said semiconductor devices from the array while leaving said one of said semiconductor devices unharmed.

13. A method as in claim 12 together with the step of depositing a layer of insulating material over the fusible link means to prevent the escape of metal particles from the fused portion of the fusible link means.

References Cited

UNITED STATES PATENTS 3,401,317 9/1968 Gault ------------- 317—234
3,415,680 12/1968 Perri et al. --------- 117—212

JOHN W. HUCKERT, Primary Examiner

W. D. LARKINS, Assistant Examiner

U.S. Cl. X.R.

29—576, 623; 317—101